(No Model.)
A. N. WILSON.
FILTER.
No. 314,281. Patented Mar. 24, 1885.
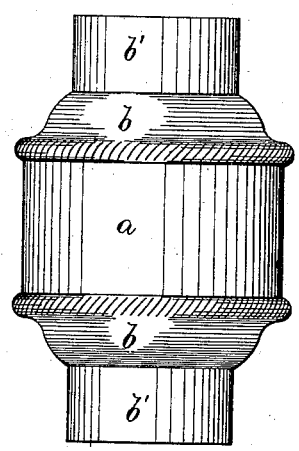
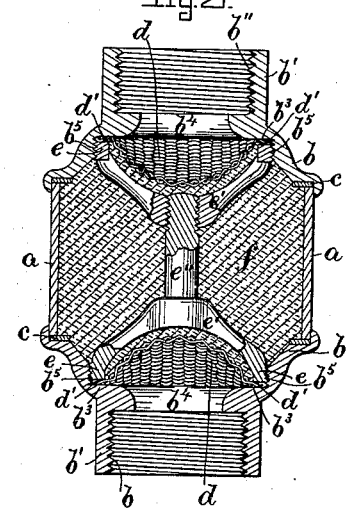
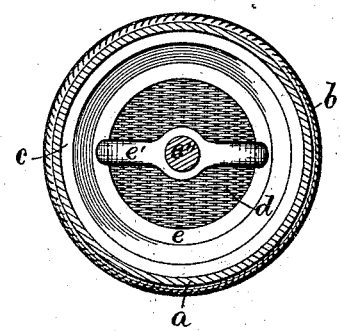
Witnesses
Henry Chadbourn.
John H. Foster.
Inventor.
Arthur N. Wilson
by
Alban Andrew
his atty.

ic  # UNITED STATES PATENT OFFICE.

ARTHUR N. WILSON, OF SALEM, MASSACHUSETTS, ASSIGNOR OF ONE-HALF TO JOHN H. SMITH, OF SAME PLACE.

FILTER.

SPECIFICATION forming part of Letters Patent No. 314,281, dated March 24, 1885.

Application filed December 24, 1884. (No model.)

*To all whom it may concern:*

Be it known that I, ARTHUR N. WILSON, a citizen of Canada, now residing at Salem, in the county of Essex and State of Massachusetts, have invented certain new and useful Improvements in Filters; and I do hereby declare that the same are fully described in the following specification and illustrated in the accompanying drawings.

This invention relates to improvements in filters for filtering water or other liquids, and it is carried out as follows, reference being had to the accompanying drawings, where—

Figure 1 represents a side elevation, and Fig. 2 represents a central longitudinal section, of the improved filter. Fig. 3 represents a cross-section on the line A B shown in Fig. 1.

Similar letters refer to similar parts wherever they occur on the different parts of the drawings.

$a$ is the cylindrical shell, preferably made from metal tubing cut off the required length, although it may be made of cast metal or glass, as may be desired.

$b\ b$ represent the end caps, fitting against the upper and lower ends of shell $a$, and there provided with suitable packing-rings, $c\ c$, as shown in Fig. 2. Each cap $b$ is provided with an outwardly-projecting hollow hub or ring, $b'$, provided with an internal screw-thread, $b''$, for securing it to a pipe or faucet in the ordinary manner. The interior of each cap $b$ has an annular seat, $b^3$, on which is supported the outer annular rim or flange, $d'$, of the half-spherical or cup-shaped strainer $d$, made of wire gauze or netting or perforated sheet metal molded to the desired form. The shape of the wire-gauze strainer $d$ is shown in Fig. 2 as being half-spherical; but it may be more or less cup-shaped without departing from the essence of my invention. $b^4$ is the perforation in the center of cap $b$ for the liquid to pass through.

The cup-shaped strainers $d\ d$ are secured to their respective seats as follows: On the inside of each cap $b$, adjoining the seat $b^3$, is made an annular screw-thread, $b^5$, into which is screwed the screw-threaded ring $e$, the under side of which confines the outer flange, $d'$, of the cup-shaped strainer $d$ between it and the seat $b^3$ in the cap $b$, as shown in Fig 2.

In one piece with each screw-threaded ring $e$ is made the curved bail or arch $e'$, as shown, one of said bails being provided with a central screw-threaded pin or spindle, $e''$, that is screwed into a central perforation in the other bail, as shown in Fig. 2, by which means the shell $a$ and the end caps, $b\ b$, are firmly secured together in a very simple and substantial manner.

$f$ represents the animal charcoal or other filtering material with which the shell $a$ is filled, as usual.

In ordinary filters in which a flat strainer is used the objection has been that the liquid has passed through the central portion of the filtering material without being distributed equally throughout its mass, and in time has caused a central hole through such mass, and thereby allowing some of the impurities in the water to pass through the filter without being arrested. This objection I obviate by making the strainers $d$ semi-spherical or cup-shaped, as shown and described, causing the liquid to enter the whole mass of the filtering material in a finely-divided form, and to pass through the whole body of such filtering material and out through the opposite cup-shaped strainer $d$ and the perforation $b^4$ in the lower cap, $b$.

With this my improved filter the liquid passes out through the perforation $b^4$ in the lower cap, $b$, as a perfectly smooth stream of a diameter proportionate to the pressure of the liquid above the filter. The device being equal in its opposite ends, it may be reversed in a similar manner as any other reversible filter now in use.

The invention is very simple in its construction, is composed of very few parts, easily secured together and as easily taken apart if the shell is to be refilled, and it can be manufactured at a very low price as compared with other first-class devices. It will also admit of the filtering material being used for a much longer time, as compared with other filters, on account of the liquid being forced and directed throughout its entire mass, as above described.

Having thus fully described the nature, construction, and operation of my invention, I wish to secure by Letters Patent and claim—

In a filter, the shell $a$, and caps $b\ b$, in combination with the semi-spherical or cup-shaped perforated strainers $d\ d$, and screw-threaded fastening-rings $e\ e$, having bails $e'\ e'$, and screw-threaded shank or spindle $e''$, for securing the filter parts together in a manner as set forth.

In testimony whereof I have affixed my signature in presence of two witnesses.

ARTHUR N. WILSON.

Witnesses:
ALBAN ANDRÉN,
GEO. GODSLAND.